(12) United States Patent
Binder et al.

(10) Patent No.: US 7,256,880 B2
(45) Date of Patent: Aug. 14, 2007

(54) GONIOPHOTOMETER

(75) Inventors: Ulrich Binder, Munich (DE); Georg Sauter, Braunschweig (DE); Walter Steudtner, Grafelfing (DE); Gerhard Trebbin, Eichstatt (DE); Norbert Wagner, Munich (DE)

(73) Assignee: Patent-Treuhand-Gesellschaft fur Elektrische Gluehlampen mbH, Munich (DE)

( * ) Notice: Subject to any disclaimer, the term of this patent is extended or adjusted under 35 U.S.C. 154(b) by 168 days.

(21) Appl. No.: 11/184,816

(22) Filed: Jul. 20, 2005

(65) Prior Publication Data

US 2006/0023222 A1 Feb. 2, 2006

(30) Foreign Application Priority Data

Jul. 30, 2004 (DE) .................. 10 2004 037 355

(51) Int. Cl.
*G01J 1/00* (2006.01)
*G01J 1/60* (2006.01)
*G01J 1/42* (2006.01)
*G01J 3/30* (2006.01)

(52) U.S. Cl. ............ 356/121; 356/214; 356/218; 356/313; 356/331; 901/2; 901/15; 901/28; 901/47

(58) Field of Classification Search ............... 356/121, 356/214, 218, 313, 326, 319, 331; 901/2, 901/15, 28, 17, 47
See application file for complete search history.

(56) References Cited

U.S. PATENT DOCUMENTS 5,253,036 A * 10/1993 Ashdown .................. 356/222
5,949,534 A * 9/1999 Guttman et al. ............ 356/121

FOREIGN PATENT DOCUMENTS

DE 3347327 7/1985
ES 2187384 6/2003

OTHER PUBLICATIONS www.ptb.de/de/org/4/41/412/kalibrierung.htm, Dec. 1999.
*Abstract*, JP 2001-255270 (Sep. 21, 2001).

* cited by examiner

*Primary Examiner*—Gregory J. Toatley, Jr.
*Assistant Examiner*—Iyabo S Alli
(74) *Attorney, Agent, or Firm*—Robert F. Clark

(57) ABSTRACT

A hemispherical goniophotometer is disclosed, in which two pivoting arms are articulated on a revolving rotating arm and are each fitted with a measurement head. The geometry of the arrangement is chosen such that the measurement heads can move along the envelope surface of a hemisphere during rotating of the rotating arm through 360° and pivoting of the pivoting arms through 180°.

18 Claims, 7 Drawing Sheets

GONIOPHOTOMETER

TECHNICAL FIELD

The invention relates to a goniophotometer for measurement of photometric, spectroradiometric and/or colorimetric variables of the optic radiation from a light/radiation source which is held at a mounting position by a measurement object holder, having at least one measurement head which points at the light/radiation source and which, in order to record the variable, can be moved by means of a guide device, which is driven by a drive, along a predetermined movement path, preferably on an envelope surface of a sphere or hemisphere around the light/radiation source.

BACKGROUND ART

Either an Ulbricht sphere photometer or a goniophotometer is used in the normal manner in order to measure the light flux of a light/radiation source.

The sphere photometer comprises a hollow sphere with an internal surface which is painted matt-white and produces multiply diffuse reflections of the light from a light source which is fitted in the interior, so that each area element of the internal surface is illuminated with equal intensity. The light intensity of an opalescent glass pane which is fitted in a viewing hole is then proportional to the total light flux. In practice, the use of a sphere photometer is relatively problematic, since adequate measurement accuracy is ensured only after complex calibration of the sphere photometer and with the environmental conditions remaining constant and with low air humidity.

Thus, in practice, goniophotometers are preferred. These are mechanical/optical measurement systems by means of which, depending on the measurement appliance head that is used, the directional dependency of variables can be determined in order to describe the optical radiation, for example of the luminance intensity distribution bodies. If the light/radiation source is located at the origin of a polar coordinate system $(r, \theta, \Phi)$, then the values of the measurement variable are measured goniophotometrically, that is to say successively in the angle ranges $0 \leq \theta \leq 180°$, $0 \leq \Phi \leq 360°$ for all directions. The integration of the luminance intensity distribution body over the complete spatial angle results in the technically and financially important total light flux.

In the already known types of compact goniophotometers, the required relative movement of a measurement appliance head with respect to the light/radiation source takes place along the envelope surface of a (fictional) sphere with a radius of up to 3 m, with the measurement direction always pointing towards the center of the sphere, at which the light/radiation source is arranged. This relative movement is achieved by rotating about two axes, which intersect at right angles, with the angles $(\theta, \Phi)$ at a constant radius, in which case, in principle, three combinations of the rotary movements are possible:

a) The light/radiation source is rotated about two axes (vertical and horizontal) with the measurement appliance head stationary. However, it has been found that the rotation about a horizontal axis results in an unacceptably major change in the photometric characteristics of the light source.

b) The light/radiation source and the measurement appliance head are each rotated in their own right about a vertical axis (source) and are moved on a circular path (measurement appliance head) about a horizontal axis. However, the rotations of the light/radiation source must be carried out very slowly in order to avoid changes in the photometric characteristics.

c) The measurement appliance head is moved on a family of circular paths along the envelope surface of a sphere with the light/radiation source stationary. Any desired mounting position of the light/radiation source and its fixed position during the measurement are in this case made possible, for example, by a complex universally jointed goniophotometer, as is described at www.ptb.de/de/org/4/41/412/kalibrierung-.htm. In this case, the light/radiation source is held in a predetermined mounting position via an outer frame, while the measurement appliance head (photometer) is guided via two inner frames, which are connected to one another in a universally-jointed manner. A universally-jointed goniophotometer such as this can be produced only with very major hardware complexity. A further disadvantage of the solutions described above is that the measurement time for determination of the light flux and of the luminance intensity distribution is relatively long and, for example, this may take 80 minutes.

A further disadvantage of the known solutions is that different measurement appliance heads must be used to measure different variables, for example the luminance intensity distribution, the three-dimensional color distribution and the luminance distribution, so that a number of measurements must be carried out successively in order to record the individual variables.

The German Physical/Technical Federal Administration (PTB) have developed a robot-assisted goniophotometer with three robot units, by means of which the measurement times can be considerably shortened in comparison to the solutions described initially.

The multiple axis robots each have a horizontal rotation axis and are mounted on walls of a measurement chamber via a high-strength holder. One robot holds the light/radiation source at the predetermined mounting position, while the two other robots, which are mutually opposite, are each fitted with at least one measurement head, which is aligned with respect to the center, that is to say with respect to the mounting position. The robots are then driven appropriately in order to move the measurement heads with radii of up to 3 m around the light/radiation source along virtually any desired movement paths.

A goniophotometer such as this is used, for example, to provide the light flux unit and, owing to its complex structure and the stringent software and hardware requirements, is very expensive, and is thus suitable only for research into fundamentals and for use at the PTB.

DISCLOSURE OF THE INVENTION

In contrast, the invention is based on the object of providing a goniophotometer which allows the measurement time to be shortened or allows the measurement of different physical variables of optical radiation with minimal hardware complexity.

For a goniophotometer for measurement of photometric, spectroradiometric and/or colorimetric variables of the optic radiation from a light/radiation source which is held at a mounting position by a measurement object holder, having at least one measurement head which points at the light/radiation source and which, in order to record the variable, can be moved by means of a guide device, which is driven by a drive, along a predetermined movement path, preferably on an envelope surface of a sphere or hemisphere around the light/radiation source, this object is achieved by an appliance unit with a revolving rotating arm with two limbs or the like which are angled with respect to one another and on each of whose end sections a pivoting arm, to which a measurement head is fitted, is mounted such that it can pivot, with their pivoting axes and the rotation axis of the rotating arm intersecting at the measurement position of the light/radiation source, and in which case the pivoting arms can be pivoted by means of a pivoting drive between a pivoted-in pole position, in which the measurement head is located on the rotation axis, and a pivoted-out equatorial position in indefinitely small steps, in which the measurement head is guided around the light/radiation source along an orbital path with a maximum diameter.

The goniophotometer is in the form of a hemispherical goniophotometer, and has an appliance unit with a revolving rotating arm, which has two limbs or bearing sections, which are angled with respect to one another. One pivoting arm, to which a measurement head is fitted, is in each case mounted on each limb of the rotating arm. The two pivoting axes of the pivoting arms and the rotation axis of the rotating arm intersect at the mounting position of a light/radiation source which is held by a measurement object holder, and which is referred to in the following text as a light source. Each pivoting arm can be pivoted about the light source by means of a pivoting drive which is associated with it between a pivoted-in pole position in which the measurement head is located on the rotation axis of the rotating arm and pivoted-out equatorial position in which the measurement head can be moved along an orbital path with a maximum diameter.

A geometry such as this allows two measurement heads to be moved at the same time along an envelope surface of a hemisphere around the light source, so that, by way of example when using two different measurement heads, two variables can be measured during one measurement process, so that the measurement time can be reduced considerably in comparison to the goniophotometers described initially with only one measurement head. The design according to the invention with a central rotating arm and with two pivoting arms articulated on it can be produced with little mechanical and control-engineering complexity in comparison to the solutions described initially, so that the goniophotometer can be produced comparatively cost-effectively.

The symmetrical design of the goniophotometer allows the design and manufacturing costs to be reduced, and the effort for programming for process control is minimal. The symmetrical configuration of the rotating arms and of the pivoting arms which are articulated on them also ensures little static and dynamic unbalance, and this can be reduced even further by pivoting the pivoting arms symmetrically with respect to one another.

The design of the goniophotometer is particularly simple when the axes of the two pivoting drives intersect an axis of the main drive for the rotating arm at an angle of 45°. With an axis arrangement such as this, the measurement heads remain aligned in the direction of the mounting position during the pivoting movement of the pivoting arms without any need for readjustment of the measurement head position.

The measurement time can be further shortened by designing the goniophotometer with two of the appliance units described above, which are arranged diametrically opposite one another, with the rotation axes of the two main drives and in each case two pivoting axes running coaxially with respect to one another. This means that all of the axes intersect at the mounting position of the light source. Each appliance unit in this case moves two measurement heads along the envelope surface of a hemisphere, so that it is either possible to record up to four different variables or else to reduce the measurement time correspondingly when using the same measurement heads, or the measurement accuracy can be increased by using two measurement heads to scan along a movement path.

The appliance units of the goniophotometer are particularly compact when the limbs of the rotating arm form an approximate V-shape with respect to one another.

In one variant according to the invention, it is preferable for the rotating arm of each appliance unit to be mounted on a bracket such that the rotation axis of the main drive runs in the horizontal direction.

In one particularly preferred exemplary embodiment, the pivoting drives of the pivoting arms of each appliance unit as well as the main drive for the rotating arm can be driven independently of one another. This makes it possible, for example, to move the two measurement heads along orbital paths which are offset with respect to one another, so that this then halves the measurement time in comparison to conventional solutions with one measurement head. Furthermore, the separate drive makes it possible to produce virtually any desired movement paths of the individual measurement heads on the envelope surface of the fictional sphere.

In the solution according to the invention, an AC synchronous direct drive is preferably used for the main drive and a geared motor is preferably used for each of the pivoting drives for the pivoting arms, and is in each case driven from an amplifier which is mounted on the rotating arm. A direct drive has the advantage that it requires no gearbox, is very compact and can be driven with high accuracy. The arrangement of the amplifier on the rotating arm has the advantage that the pulsed power signals for the driving the geared motors need be transmitted over only a very short distance, thus reducing the risk of interference with measurement signals or the like.

As already indicated above, the measurement heads may be designed differently and, for example, it is possible to use a photometer, a three-range color head, a spectral radiometer or a luminance camera, in which case the measurement signal should likewise be digitized very close to the measurement head. The invention thus provides for the actual measurement appliances together with the A/D converters likewise to be mounted on the rotating arms.

In one particularly preferred exemplary embodiment, the digitized measurement signals and any analog measurement signals which may be present, and/or the control signals for the rotating drives are tapped off via a slipring, which is arranged coaxially with respect to the rotation axis, and a bus system.

The positioning of the measurement object in the horizontal direction is particularly simple if the main drive is designed with a hollow shaft so that supporting arms for a measurement object holder can extend through the hollow shaft.

The risk of collision between the appliance units is minimal if the rotating arms revolve offset—preferably through 90°—with respect to one another during measurement operation, with the two pivoting arms of an appliance unit preferably being arranged at or close to the pole position, and the pivoting arms of the other appliance unit preferably being arranged at or close to the equatorial position at the start of the measurement.

The pivoting drives for the pivoting arms are preferably designed such that they can be pivoted such that they revolve through 360°.

The positioning of the light source and the adjustment of the system are particularly simple when positioning lasers or the like are arranged on each of the axes of the goniophotometer.

The pivoting arms and the rotating arm have associated rotation angle sensors, in order to record their rotation position.

By way of example, in the situation in which one of the appliance units is used as the measurement object holder, it is advantageous for the measurement appliance holder to be designed such that the light source can be rotated.

BRIEF DESCRIPTION OF THE DRAWINGS

The invention will be explained in more detail in the following text using one exemplary embodiment and with reference to the drawings, in which.

BEST MODE FOR CARRYING OUT THE INVENTION

Figure 1:
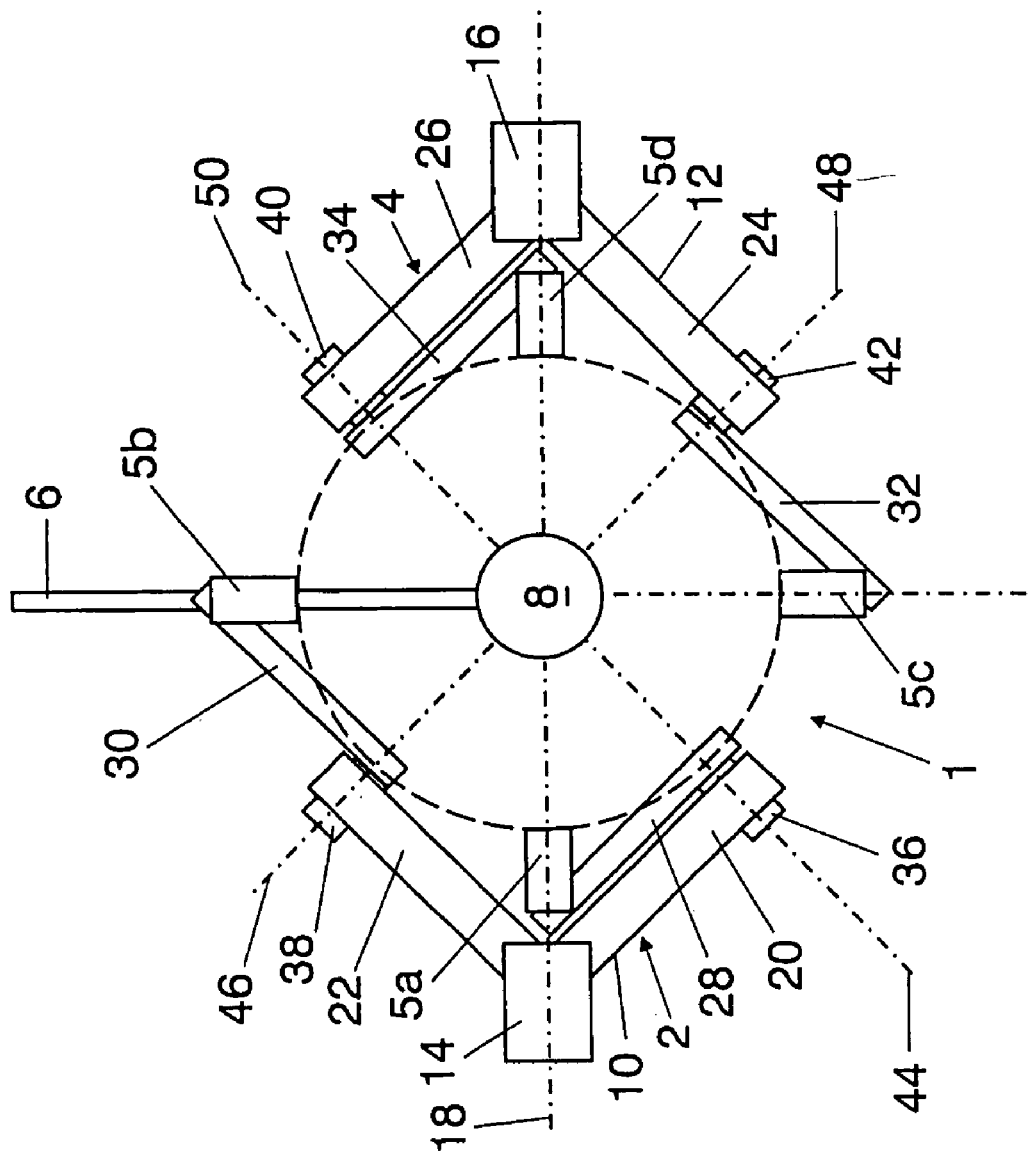
FIG. 1 shows a schematic illustration of a hemispherical goniophotometer according to the invention (in a view from the side)

FIG. 1 shows a schematic illustration of a hemispherical goniophotometer 1 which essentially comprises two appliance units 2, 4 and a measurement object holder 6 which positions a light or radiation source, for example a lamp 8, between the two appliance units 2, 4.

Each appliance unit 2, 4 is fitted with two measurement heads 5a, 5b and 5c, 5d, respectively, with the kinematics being designed such that the two measurement heads 5a, 5b; 5c, 5d of the appliance units 2, 4 can each be moved along an envelope surface of a hemisphere. The hemispheres which are covered by the two appliance units 2, 4 are then added together to form a complete sphere, as is indicated by dashed lines in FIG. 1.

Each appliance unit 2, 4 has an approximately V-shaped respective rotating arm 10 or 12, which arms are in each case mounted by means of a main drive 14 or 16, respectively, such that they revolve around a common rotation axis 18 which runs through the lamp 8, which is held at its mounting position.

Each of the rotating arms 10, 12 has two limbs 20, 22; 24, 26, which open towards the lamp 8 and on whose respective end section a pivoting arm 28, 30 or 32, 34 is mounted such that it can rotate. These are pivoted by means of pivoting drives 36, 38; 40, 42, which can be driven independently of one another like the two main drives 14, 16. One of the measurement heads 5a, 5b, 5c, 5d is arranged on each of the free end sections of the pivoting arms 28, 30, 32, 34 such that it is aligned with respect to the mounting position of the lamp 8.

According to FIG. 1, the pivoting axes 44, 50 of the two pivoting arms 28, 34 and the pivoting axes 46, 48 of the two pivoting arms 30, 32 each run coaxially with respect to one another, and all of the axes intersect at the mounting position of the lamp 8. The angle of the axes 46, 48 and 44, 50 with respect to the rotation axis 18 is 45°, that is to say the pivoting axes 46, 48 and 44, 50 are at right angles to one another. The measurement heads 5a, 5b, 5c, 5d are arranged on the end sections of the pivoting arms 28, 30, 32, 34 in such a way that their optical axis intersects the mounting position, and thus the intersection of the axes, during the orbital path. In consequence, the optical axis of the measurement heads 5a, 5b, 5c, 5d is at an angle of 45° to the respective pivoting axes 44, 46, 48, 50.

In the schematic illustration shown in FIG. 1, the two pivoting arms 30, 32 are in an extended equatorial position, in which they extend approximately at an extension of the two limbs 22 and 24, respectively. The two measurement heads 5b, 5c of these pivoting arms 30, 32 then pass over an equator of the fictional sphere during rotation of the two rotating arms 10, 12 about the rotation axis 18. The two other pivoting arms 28, 34 are located in a pivoted-in pole position, in which their measurement heads 5a, 5b lie on the rotation axis 18, and are thus aligned with respect to the two poles of the sphere. It is assumed that these positions are set at the start of a measurement. During the measurement, the pivoted-out pivoting arms 30, 32 are then pivoted in steps through a predetermined rotation angle during each revolution while, in a corresponding manner, the pivoting arms 28, 34 which were pivoted in at the start of the measurement are pivoted out in steps, in the opposite sense. For the situation where all four measurement heads 5a, 5b, 5c, 5d are designed identically, the measurement heads of one appliance unit 2, 4 can either each be moved along a common movement path or along movement paths which are offset with respect to one another. In the first variant, the measurement points are thus each approached once by the two measurement heads 5a, 5b while, in the last-mentioned variant, each measurement head 5a, 5b, 5c, 5d records different measurement points. During a complete measurement cycle, virtually any measurement point on the fictional sphere in the angle range of $0 \leq \theta \leq 180°$ and $0 \leq \Phi \leq 360°$ can be scanned, depending on the drive to the two appliance units 2, 4. In practice, as will be explained in the following text, approximately 64 800 measurement points are recorded and are integrated to determine the light flux during one measurement cycle.

When using four identical measurement heads 5a, 5b, 5c and 5d, the measurement time can be correspondingly reduced to one quarter of that of conventional solutions with one measurement head. However, in practice, applications may be more important in which each appliance unit 2, 4 is fitted with different measurement heads 5a, 5b, 5c, 5d so that, in addition to determining the light flux and determining the complete light distribution body of lamps and smaller lights, further variables, such as the three-dimensional color distributions, spectral distributions and luminance distributions, can also be measured. In this case, each appliance unit 2, 4 may be designed with the same pair of measurement heads (two different measurement heads in each case), so that, for example when using a three-range color measurement head and a spectral radiometer, virtually all of the photometric, colorimetric and spectroradiometric variables can be determined in a quarter of the measurement time which would be required with a conventional goniophotometer with one measurement head. Two complete measurement cycles with one measurement head in each case would have to be carried out with a conventional appliance such as this, to which the time required to replace the measurement head would have to be added.

If four different measurement heads 5a, 5b, 5c, 5d were to be used, the measurement object holder 6 would have to be mounted such that it can rotate such that the lamp 8 is rotated through 180° after completion of a first measurement, for the second half measurement. After this, all of the measured values from four different measurement systems would be available, resolved as a function of the direction for the entire spatial angle range without any conversion, with the measurement duration corresponding just to that of one measurement with conventional goniophotometers.

A simultaneous measurement with the same measurement heads allows the measured values to be used, by determination of correlation coefficients, to detect and correct any possible instabilities—no such capability is provided with conventional goniophotometers.

Figure 2:
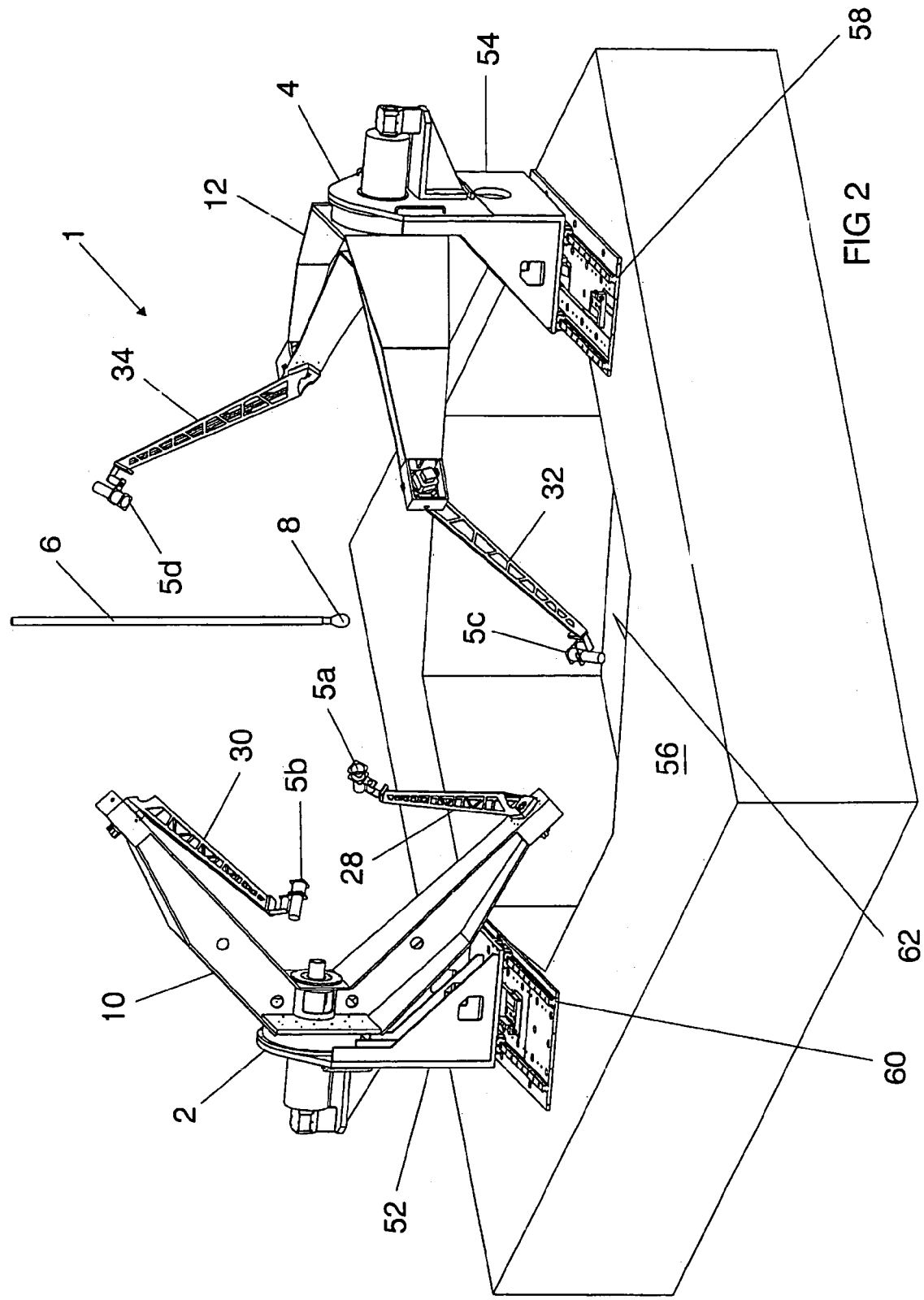
FIG. 2 shows a three-dimensional illustration of the hemispherical goniophotometer.

FIG. 2 shows one specific embodiment of a hemispherical goniophotometer 1. The two appliance units 2, 4 with the rotating arms 10, 12 as well as the pivoting arms 28, 30; 32, 34 which are articulated on them are each mounted via a bracket 52, 54 on a foundation 56 in a measurement chamber. In the described exemplary embodiment, the brackets 52, 54 can be moved along guides 58, 60 which are supported on the foundation 56, such that on the one hand the appliance units 2, 4 can be aligned exactly with reference to the mounting position of the lamp 8, and on the other hand the very heavy appliance units 2, 4 can be moved from their measurement position to a parked position in order to provide better accessibility to the measurement chamber. All of the outer surfaces of the measurement system as well as the walls of the measurement chamber are provided with low-reflection paintwork.

The foundation 56 has a base recess 62 between the two appliance units 2, 4, which the completely pivoted-out pivoting arms 28, 30, 32, 34 can enter during a measurement cycle. In the described exemplary embodiment, the lamp or light 8 is held in a suspended mounting position by means of the measurement object holder 6. As will be explained in more detail in the following text, other mounting positions with minimal shadowing may, of course, also be chosen.

Details of the identically constructed appliance units 2, 4 will be explained in the following text with reference to FIG. 3, which shows the appliance unit 2 as shown in FIG. 2.

Since the goniophotometer is dependent on the capability to position the measurement heads 5a, 5b, 5c, 5d as exactly and reproducibly as possible, all of the load-bearing components of the appliance units 2, 4 are designed to be highly robust, although attention was paid to keeping the weight as low as possible, in order to minimize the moments of inertia.

The bracket 52 is a welded structure and has an approximately L-shaped configuration, which is reinforced by reinforcing ribs 64. Guide shoes 66 are formed on the lower, shorter L limb of the bracket 52 and allow movement along the two parallel guides 60. The longer, vertically extending L limb of the bracket 52 is in the form of a supporting plate 68, to which the main drive 14 for the rotating arm 10 is flange-connected. In the described exemplary embodiment, this main drive 14 is in the form of an AC synchronous direct drive, which is physically very short in the axial direction and can be driven with very high accuracy. The rotating arm 10, which in the described exemplary embodiment is produced from a double-T profile that is designed to be broader on the rear face than on the front face (towards the lamp 8), is seated on the shaft of the main drive 14. In this case, the two limbs 20, 22 extend outwards in a V-shape from a base 70 which connects them and runs vertically, with the double-T profile tapering towards the end sections. The shaft of the main drive 14 to which the rotating arm 10 is fitted is in the form of a hollow shaft and is connected to the base 70 of the rotating arm 10 such that they rotate together. As can be seen from FIG. 3, a positioning laser 72 is inserted into the lamp-side end section of the hollow shaft or into a corresponding recess in the base 70, with its optical axis running on the rotation axis 18. Corresponding positioning lasers (not shown) may also be provided on the pivoting axes 44, 46, 48, 50 and on the measurement heads 5a, 5b, 5c, 5d in order to simplify exact positioning of the lamp 8 and adjustment of the overall system.

The shaft of the main drive 14 is lengthened to the rear (to the left in FIG. 3) through the supporting plate 68 of the bracket 52, and is fitted with a slipring system 74 via which all of the major measurement signals and control signals for the pivoting drives 36, 38, 40, 42 are passed. The control unit (not shown) for driving the main drive 14 is mounted on the rear face of the supporting plate 68. The electrical power supply for the amplifiers 76, 78 for the drives and for the measurement appliances 80, 82 is likewise provided via the slipring arrangement 74.

The pivoting drives 36, 38 for the two pivoting arms 28, 30 are mounted on the free end sections of the two limbs 20, 22. These pivoting drives 36, 38 are geared motors which are physically very compact and can each be driven via an amplifier 76, 78. According to the invention, as is indicated by dashed lines in FIG. 3, these are also mounted on the rotating arm 10, so that the pulsed power signals for driving the pivoting drives 36, 38 need be passed only over a comparatively short distance. The control signals which are supplied to the amplifier 76, 78 are transmitted in the form of a drive bus via the slipring arrangement 74.

In a corresponding manner, the measurement appliances and A/D converters 80, 82 which are associated with the measurement heads 5a, 5b are also mounted on the supporting arm 10, so that the signals which are recorded by the measurement head 5a, 5b are transmitted along very short lines to the measurement appliance 80, 82, where they are digitized and are then tapped off via a bus (Profibus, IEEE 488, CAN) and the slipring arrangement 74. Since no pulsed power signals for driving the pivoting drives 36, 38, 40, 42 are passed via the slipring arrangement, it is possible to prevent interference between the measurement signals and the power signals. The short transmission paths from the main drive controller to the main drive 14 and from the amplifiers 76, 78 to the pivoting drives 36, 38, as well as the short signal transmission paths between the measurement heads 5a, 5b and the measurement appliances 80, 82 associated with them allow the measurement errors to be reduced to a minimum. The design is sufficiently robust that the arrangement of the measurement appliances 80, 82 and of the amplifiers 76, 78 on the rotating arm 10 is not significant either in terms of deformation of the components or in terms of the accuracy of the rotational movement. In principle, it is also possible to fit a signal processing computer to the rotating arm 10, with the data then being transmitted, for example, by means of Ethernet, WLAN, etc.

The pivoting arms 28, 30 are in the form of a framework structure with a triangular profile in order to minimize the weight, tapering towards the measurement heads 5a, 5b. In this case, holders 84, 86, which have receptacles for attachment of the measurement heads 5a, 5b, are provided on the end sections of the pivoting arms 28, 30. These holders 84, 86 are arranged on the supporting arms 28, 30 such that the measurement heads 5a, 5b are always aligned towards the mounting position during the pivoting movement of the pivoting arms 28, 30 and the revolving rotary movement of the rotating arm 10. This is achieved by positioning the axis of the measurement heads 5a, 5b at an angle of 45° to the pivoting axis of the respective pivoting drive 36, 38.

In the illustrated exemplary embodiment, the geometry of the two limbs 20, 22 of the rotating arm 10 and the geometry of the two pivoting arms 28, 30 are chosen such that, in the pivoted in position, the gap between the respective limb 20, 22 and the pivoting arm 28, 30 which is articulated on it increases away from the pivoting drive 36, 38 towards the measurement head 5a, 5b, with the measurement head 5a or the measurement head 5b being located on the pivoting axis 18 when the pivoting arm 28, 30 is pivoted in completely. This means that the two measurement heads 5a, 5b can reach the pole position only successively.

All of the rotating or pivoting drives of the system have associated rotation angle sensors, via which the angular position of the rotating arms 10, 12 and of the pivoting arms 28, 30 can be recorded, and, from this, the rotation rate of these elements. The corresponding signals from the rotation angle sensors are likewise transmitted via the bus system and the slipring arrangement 74.

Figure 3:
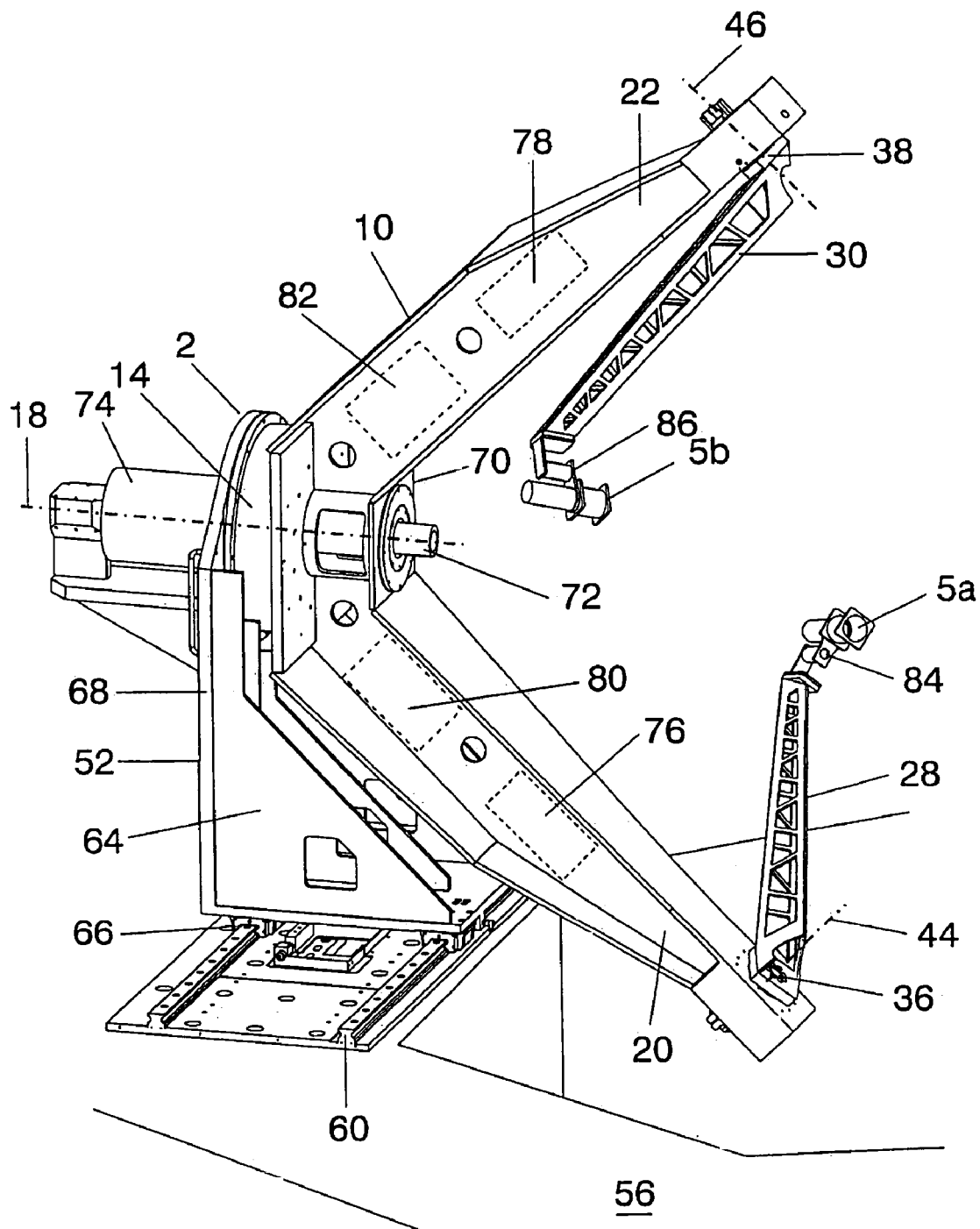
FIG. 3 shows a detailed illustration of an appliance unit for the goniophotometer shown in FIG. 2.
Figure 4:
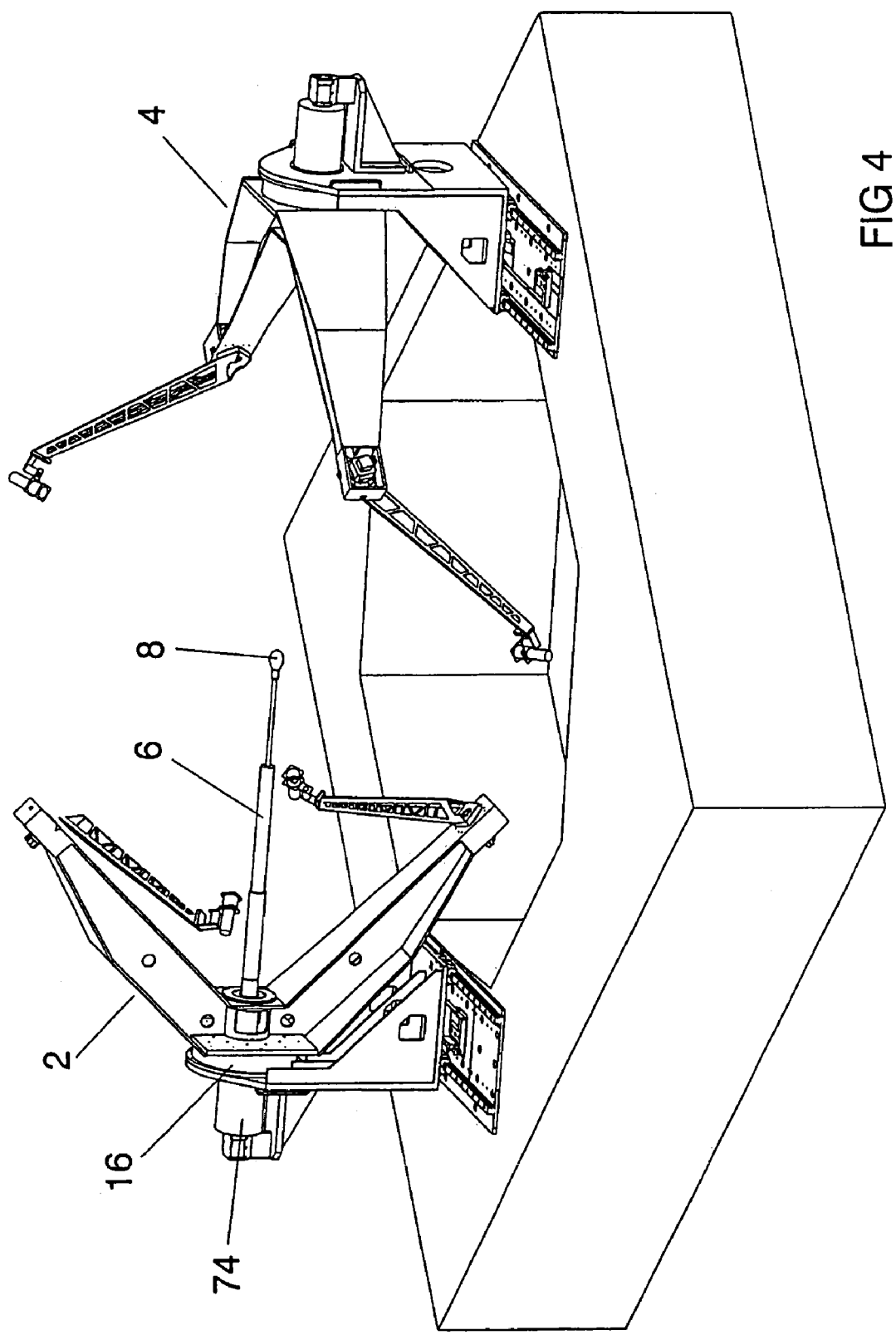
FIG. 4 shows the goniophotometer from FIG. 2 with a horizontally running measurement object holder.

In the exemplary embodiment illustrated in FIG. 3, the lamp 8 is held in a suspended mounting position. FIG. 4 shows an exemplary embodiment in which the lamp 8 is held in the horizontal position on one side, with the measurement object holder 6 passing through the hollow shaft and the slipring arrangement 74 in the axial direction, and being attached at the rear. A measurement object holder 6 can also pass through the appliance unit 4 for attachment of light sources with caps at both ends, for example fluorescent lamps, so that the fluorescent tube is held in the horizontal direction at both ends. In a corresponding manner, it is also possible for the lamp to be held at both ends in the vertical direction, with a further measurement object holder being mounted vertically in the base recess 62. In principle, it is also possible to hold the lamp 8 by means of an appliance unit 2, in which case a hemisphere is then covered via the other appliance unit 4, with the second hemisphere then being scanned after rotation of the lamp 8 through 180°. However, in practice, this capability will in fact be only of secondary importance. Nonetheless, this allows the angular dependency of the radiation variables on the mounting position of lamps to be investigated without any additional complexity.

As described initially, the two pivoting arms 28, 30; 32, 34 of each appliance unit 2, 4 can assume different relative positions with respect to one another at the start and at the end of a measurement cycle. In principle, it is preferable for the pivoting arms each to assume approximately symmetrical positions with respect to one another in order to minimize the static and dynamic unbalance. For example, when using a suspended mounting position, one pivoting arm 28, 30 can be moved to a pole position, while the other pivoting arm 28, 30 is arranged offset through one or two angular positions with respect to this, in order to avoid a collision between the measurement heads 5a, 5b. This means that the two pivoting arms 28, 30 on one rotating arm 10 are, for example, very largely in the retracted position while, in order to avoid collisions, the two pivoting arms 32, 34 on the other appliance unit 4 are at or close to the extended equatorial position. As described, the measurement heads 5a, 5b, 5c, 5d of an appliance unit 2, 4 are moved during the measurement process either on the same movement paths (double measurement) or on different movement paths (in order to shorten the measurement duration). In this case, the movement path may extend in a spiral shape between the pole and equator, or the movement path runs along a circular path in each angular step so that, so to speak, the sphere is subdivided into "slices".

Figure 5:
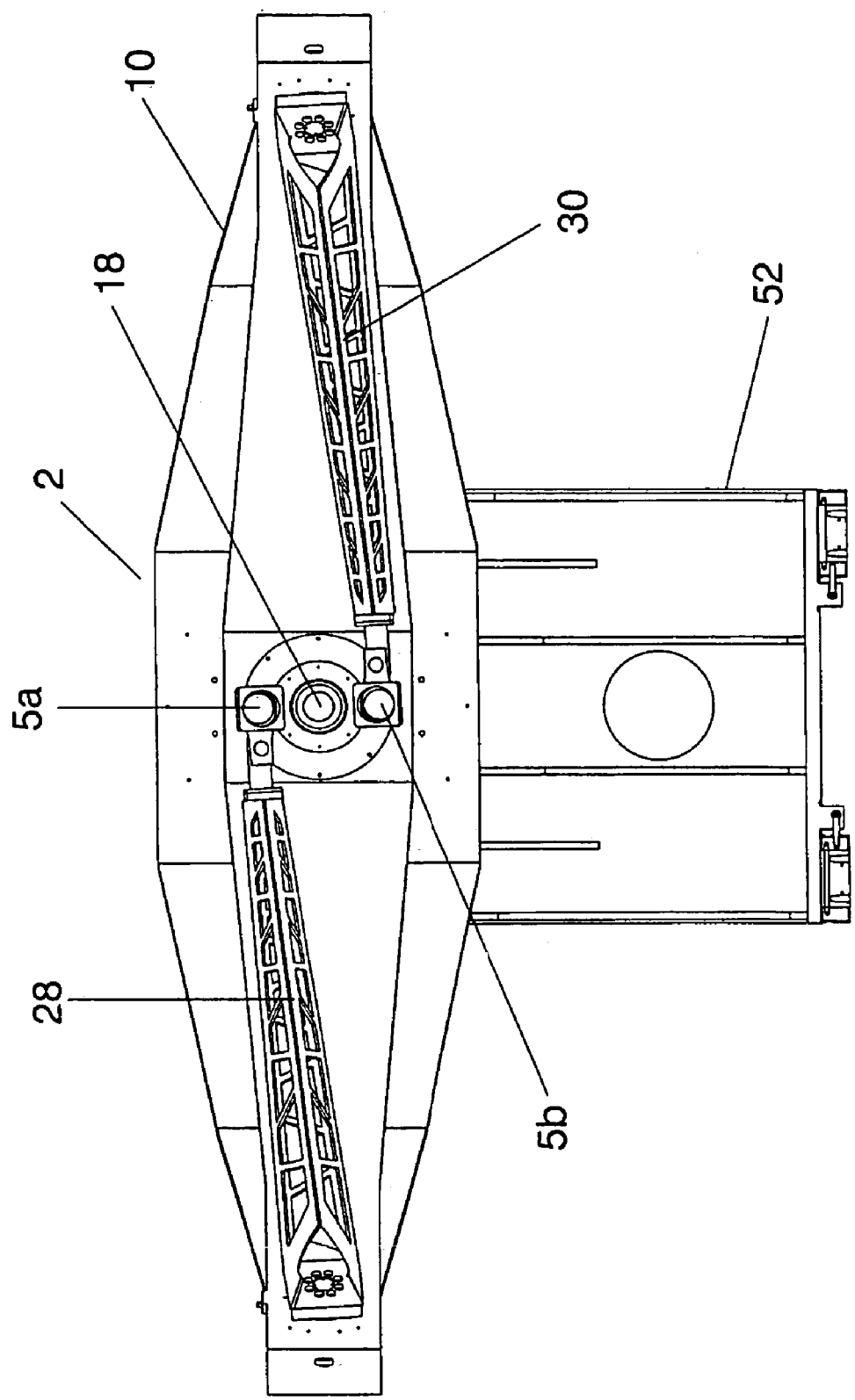
FIG. 5 shows a front view of the appliance holder from FIG. 3 at the start of a measurement cycle.
Figure 6:
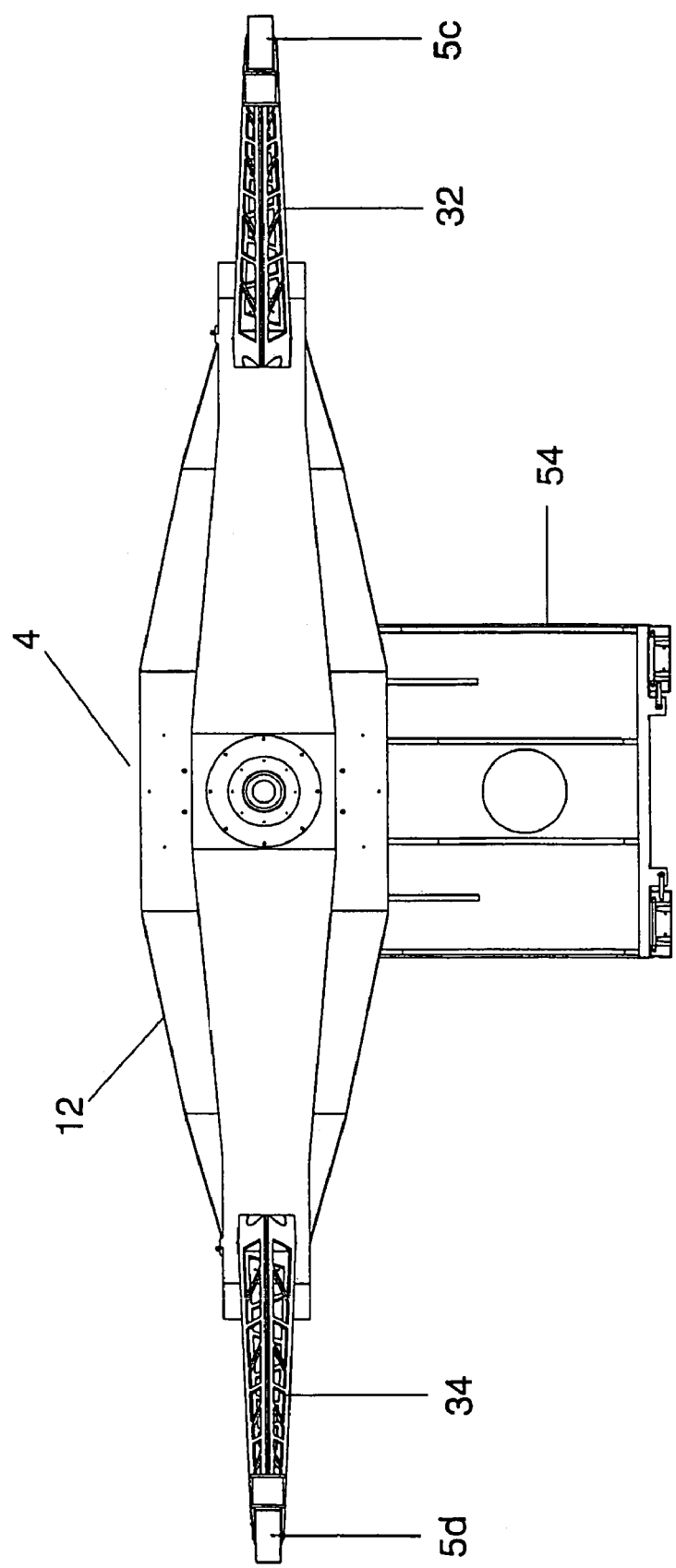
FIG. 6 shows a front view of the second appliance unit of the goniophotometer as shown in FIG. 2 at the start of the measurement cycle.

FIG. 5 shows a front view in the direction of the rotation axis 18 of the appliance unit 2, with both pivoting arms 28, 30 being located close to the pole position. In the illustrated relative position, neither of the measurement heads 5a, 5b is located on the rotation axis 18 of the main drives. This pivoting arm position 28, 30 is, for example, required when the lamp 8 is mounted in a horizontal mounting position as shown in FIG. 4 since, otherwise, the measurement heads 5a, 5b would collide with the measurement object holder 6. The two pivoting arms 32, 34 of the other appliance unit 4 may then be located in the completely extended equatorial position as illustrated in FIG. 6, in which the two measurement heads 5c, 5d are moved around the lamp 8 on a maximum orbital path with a diameter of, for example, 5 950 mm. The pivoting arms 28, 30 are then extended in opposite senses, while the pivoting arms 32, 34 are retracted in opposite senses.

Figure 7:
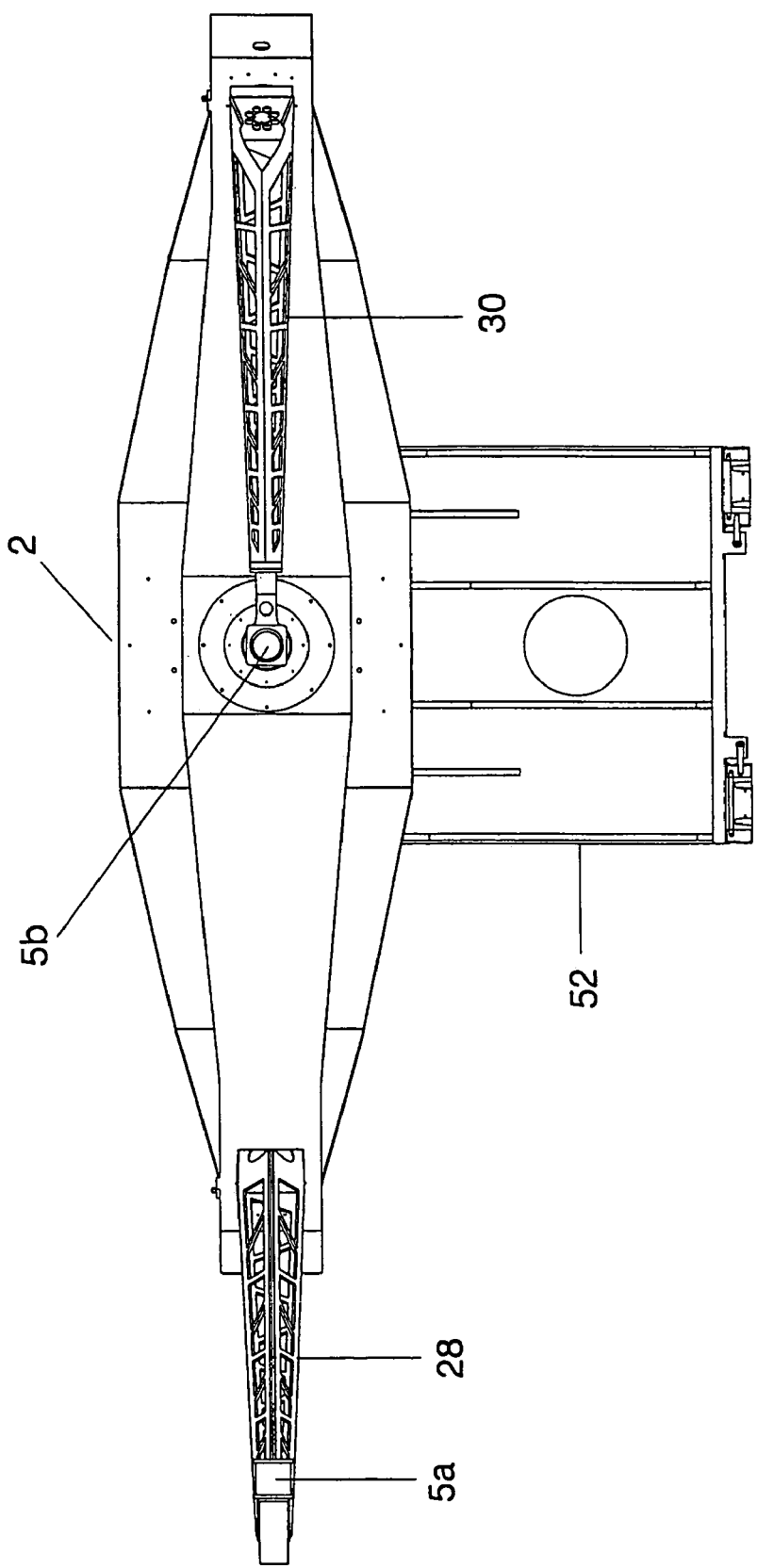
FIG. 7 shows a plan view of an appliance unit, in which one pivoting arm is pivoted in, and whose second pivoting arm is pivoted out.

When the pivoting arms 28, 30, 32, 34 are in the relative positions described above, they are arranged essentially symmetrically. FIG. 7 shows a position at the start or at the end of a measurement cycle, with the pivoting arm 30 being pivoted into its pole position, and the measurement head 5b thus being located on the rotation axis 18, while the other rotating arm 28 is pivoted out to its equatorial position, and the measurement head 5a revolves along a great circle. The asymmetric arrangement of the pivoting arms 28, 30 admittedly introduces a certain amount of static and dynamic unbalance into the system, but relative arrangements such as these are also feasible without any problems owing to the robust structure.

The physical form of the two appliance units 2, 4 described above allows each measurement head 5 to be placed such that it is aligned with respect to the appliance center (the center point of the lamp 8) at any point on its hemisphere. The actual measurement operation must, however, be carried out during movement, because the time interval, for example just to achieve an angular resolution of $\Delta\Phi=\Delta\theta=1°$ with a stop and go movement would mean that 64 800 associated positions would have to be assumed, and would therefore be much too long. In order to avoid collisions between the measurement heads 5 during operation of the goniophotometer 1, the following fundamental rules must be complied with:

a) the pole position must be assumed successively by the two measurement heads 5 for each appliance unit 2, 4;

b) in the equatorial position, collisions between the measurement heads 5 are avoided by rotating the rotating arms 10, 12 in the same sense and offset, for example, through 90°. This will also interactively avoid the scatter light component resulting from reflection on the light inlet surface;

c) when the pivoting arms 28, 30, 32, 34 are in the equatorial position, each measurement head 5 would collide with the measurement object holder 6 (assuming a suspended, vertical mounting position) once per revolution. However, since the position of the holder is known precisely, the collision can be avoided by an escape maneuver by the respective individually controlled pivoting drive.

The individually controlled drives allow movements of the measurement appliance heads on different paths, for example at a constant path speed, with a constant spatial angle component, or optimized to take account of the luminance intensity distribution to be measured.

In the exemplary embodiment described above, the radius of the two hemispheres cannot be changed. This could be achieved, for example, by equipping each of the pivoting arms 28, 30, 32, 34 with further axes, so that it is possible to vary the radius of the measurement heads 5 within certain limits. However, a solution such as this would significantly increase the complexity for production of the hemispherical goniophotometer.

A hemispherical goniophotometer is disclosed in which two pivoting arms, each of which is fitted with a measurement head, are articulated on a revolving rotating arm. The geometry of the arrangement is chosen such that the measurement heads can move along the envelope surface of a hemisphere during rotation of the rotating arm through 360° and pivoting of the pivoting arms through 180°.

What is claimed is:

1. A goniophotometer for measurement of photometric, spectroradiometric and/or colorimetric variables of the optic radiation from a light/radiation source which is held at a measurement position by a measurement object holder, the goniometer having an appliance unit with a rotating arm mounted to a main drive, the rotating arm having a rotation axis and two limbs which are angled with respect to one another, each limb having a pivoting arm which is pivotably mounted to an end section of the limb, each pivoting arm having a pivoting axis and a measurement head which points at the light/radiation source, the pivoting axes of the pivoting arms and the rotation axis of the rotating arm intersecting at the measurement position of the light/radiation source, and in which case the pivoting arms are pivoted by means of a pivoting drive between a pivoted-in pole position, in which the measurement head of the pivoting arm is located on the rotation axis, and a pivoted-out equatorial position, in which the measurement head of the pivoting arm is guided around the light/radiation source along an orbital path with a maximum diameter.

2. The goniophotometer as claimed in claim 1, in which the pivoting axes each include an angle of 45° with the rotation axis.

3. The goniophotometer as claimed in claim 1, with two appliance units being arranged diametrically opposite one another, and with the rotation axes of the appliance units running coaxially with respect to one another and each pivoting axis of one appliance unit running coaxially with one of the pivoting axes of the other appliance unit.

4. The goniophotometer as claimed in claim 1, with the limbs of the rotating arm being arranged approximately in a V-shape with respect to one another.

5. The goniophotometer as claimed in claim 1, with the rotating arm being mounted such that it rotates on a bracket to which the main drive is fitted and is moveable along a guide, with the rotation axis of the main drive running parallel to a foundation, to which the guide is fitted.

6. The goniophotometer as claimed in claim 1, with the main drive and the pivoting drives of the pivoting arms being drivable independently of one another, such that the measurement heads of the appliance unit are moveable along different movement paths or the same movement paths.

7. The goniophotometer as claimed in claim 1, with the main drive being a rotating AC synchronous direct drive and each pivoting drive being a geared motor which is driven via an amplifier, with the amplifier being mounted on the rotating arm.

8. The goniophotometer as claimed in claim 1, with the measurement heads being selected from a photometer, a three-area color measurement head, a spectral radiometer or a luminance intensity camera.

9. The goniophotometer as claimed in claim 3, with each measurement head being of a different type or of the same type, or both appliance units having a same pair of measurement heads.

10. The goniophotometer as claimed in claim 6, in which case digitized measurement signals, analog measurement signals and/or control signals for the drives are transmitted via a slipring, which is arranged coaxial with respect to the rotation axis, and a bus system.

11. The goniophotometer as claimed in claim 10, with the main drive being designed with a hollow shaft to which the slipring arrangement is fitted and through which the measurement object holder as well as supply lines or measurement lines pass coaxially.

12. The goniophotometer as claimed in claim 3, with the rotating arms revolving offset with respect to one another during measurement operation, and with the two pivoting arms of one appliance unit being arranged in or close to the pole position and the pivoting arms of the other appliance unit being arranged in or close to the equatorial position at the start of the measurement.

13. The goniophotometer as claimed in claim 1, in which case the pivoting arms can pivot through 360°.

14. The goniophotometer as claimed in claim 1, with positioning lasers being arranged on the axes.

15. The goniophotometer as claimed in claim 1, with the main drive and/or the pivoting drives having associated rotation angle sensors for recording a rotation position and a rotation rate of the rotating arm and/or of the pivoting arms.

16. The goniophotometer as claimed in claim 1, with the light/radiation source being rotatably mounted on the measurement object holder.

17. The goniophotometer as claimed in claim 2, with two appliance units being arranged diametrically opposite one another, and with the rotation axes of the appliance units running coaxially with respect to one another and each pivoting axis of one appliance unit running coaxially with one of the pivoting axes of the other appliance unit.

18. The goniophotometer as claimed in claim 1, wherein the measurement heads are moved on an envelope surface of a sphere or hemisphere around the light/radiation source.

* * * * *